United States Patent
Volk

(10) Patent No.: US 6,899,353 B2
(45) Date of Patent: May 31, 2005

(54) VEHICLE SEAT BELT DEVICE

(76) Inventor: Karl E. Volk, 27 Pettaconsett Ave., Warwick, RI (US) 02888

( * ) Notice: Subject to any disclaimer, the term of this patent is extended or adjusted under 35 U.S.C. 154(b) by 119 days.

(21) Appl. No.: 10/372,125

(22) Filed: Feb. 25, 2003

(65) Prior Publication Data

US 2003/0197363 A1 Oct. 23, 2003

Related U.S. Application Data

(60) Provisional application No. 60/358,833, filed on Feb. 25, 2002.

(51) Int. Cl.[7] .............................................. B60R 22/00
(52) U.S. Cl. ..................... 280/801.1; 280/802; 280/808
(58) Field of Search ........................... 280/801.1, 802, 280/803, 808; 297/468, 483

(56) References Cited

U.S. PATENT DOCUMENTS

| | | |
|---|---|---|
| 482,271 A | 9/1892 | Openshaw et al. |
| 558,019 A | 4/1896 | Harshaw |
| 2,663,031 A | 12/1953 | Kalthoff |
| 2,960,180 A | 11/1960 | Wachtel |
| 3,233,941 A | 2/1966 | Selzer |
| 3,495,849 A | 2/1970 | Cetrone |
| 3,799,577 A | 3/1974 | Colucci |
| 3,940,166 A | 2/1976 | Smithen |
| 4,177,807 A | 12/1979 | Ocel et al. |
| 4,234,229 A | 11/1980 | Arnold |
| 4,528,705 A | 7/1985 | Greenwalt |
| 4,541,654 A | 9/1985 | Jonasson |
| 4,619,468 A | 10/1986 | Spill |
| 4,758,048 A | 7/1988 | Shuman |
| 4,759,588 A | 7/1988 | Husnik |
| 4,819,278 A | 4/1989 | Ramos |
| 4,834,460 A | 5/1989 | Herwig |
| 4,840,404 A | 6/1989 | Falterman |
| 4,951,965 A | 8/1990 | Brown |
| 5,016,915 A | 5/1991 | Perry |
| 5,074,588 A | 12/1991 | Huspen |
| 5,439,253 A | 8/1995 | Trubiano |
| 5,482,324 A | 1/1996 | Gardiner et al. |
| 5,570,933 A | 11/1996 | Rouhana et al. |
| 5,624,135 A | 4/1997 | Symonds |
| 5,647,611 A | 7/1997 | Boyd et al. |
| 5,788,282 A | 8/1998 | Lewis |
| 5,836,656 A | 11/1998 | Baggott |
| 5,909,927 A | 6/1999 | Henshall |
| 5,934,749 A | 8/1999 | Pond et al. |
| 6,213,508 B1 | 4/2001 | Cornell |
| 6,425,602 B1 * | 7/2002 | Al-Amin et al. ......... 280/730.2 |
| 6,508,500 B2 * | 1/2003 | Bowers ..................... 296/68.1 |

FOREIGN PATENT DOCUMENTS

| | | |
|---|---|---|
| DE | 2838141 | 3/1980 |
| GB | 2208468 | 4/1989 |
| NL | 260924 | 5/1964 |

* cited by examiner

*Primary Examiner*—Paul N. Dickson
*Assistant Examiner*—Toan C To
(74) *Attorney, Agent, or Firm*—Fisher, Christen & Sabol

(57) ABSTRACT

The seat belt incorporates a self-adjusting retractable shoulder belt and a continuous lap belt into an arrangement that is easy to use and provides increased safety in the case of front end collision or roll over.

3 Claims, 5 Drawing Sheets

VEHICLE SEAT BELT DEVICE

This application has priority benefit of U.S. Provisional Application No. 60/358,833, filed on Feb. 25, 2002.

BACKGROUND OF THE INVENTION

1. Field of the Invention

This invention is related to seat belts for vehicles, especially motor vehicles, and other means of conveyance, such as, boats and aircraft.

2. Background Art

There is a widespread use of, and requirement of use of, conventional three-point harness or shoulder belts in most vehicles such as automobiles and the like. Such harness or shoulder belts are conventionally attached to vertically-spaced first and second mounting points on the vehicles' framework, such as a reinforced post and the like. The opposed terminal belt ends are attached to these mounting points and a fastener is provided upon the intermediate run of belt such that the belt may be drawn across one's shoulder and chest and affixed on the side of the seat to a third vehicle mounting point. In addition, some mechanism to allow the belt to be gradually played out and frictionally withdrawn to provide a comfortable yet snug belt fit upon the user in a seated position upon the vehicle seat while additionally providing for fixed restraint during an emergency, such as a vehicle accident. The general intention of such belts is to prevent the vehicle's occupants from being thrown forward during a frontal vehicle crash. Such belts have met with remarkable success for such purpose.

There are, however, a number of accident types which, instead of subjecting the driver or passengers to a forward motion, subject them to motion that includes at least rearward force such that the vehicle's occupants, particularly those sitting in the front seats, are thrown rearward and injured as a result thereof. Strongly reinforced vehicle front seat backs in most cases could prevent the rearward motion of the front seat occupants, but such added restructure is costly and involved and may interfere with the operation of the seat backs which afford access to the rear seats to provide desirable tilting movement thereto. Accordingly, it is desirable to provide some means by which passengers and vehicle drivers are prevented from being physically thrown rearward during such accidents.

While there are some devices that provide back support or restraint to vehicle occupants or operators, especially bicycles and motorcycles and the like, none of these devices is especially adapted to or particularly useful with the standard three-point shoulder belt or harness provided in modern vehicles.

The conventional three-point seat belts also have the problem that it is common for occupants of motor vehicles to slide out of such seat belts to the front (forward) in a front end collision or to the top (upward) in a roll over.

BROAD DESCRIPTION OF THE INVENTION

A main object of the invention is to provide an improved seat belt (harness) device or arrangement that does not have the disadvantages and problems of the prior art described herein. Other objects and advantages of the invention are set out herein or are obvious here from to one skilled in the art.

The objects and advantages of the invention are achieved by the device of the invention.

The purpose of the invention seat belt arrangement is to surround an occupant's waist with a continuous belt that automatically self adjusts to the individual's size. The retractors used in the invention system, allow the occupant to buckle up as usual with no adjustments to the belt required. This arrangement will hold the passengers in their seats better in a crash or roll over situation. With today's three-point belts it is common for people to slide out (of such prior belts) to the front in a front collision or slide out the top (of such prior belts) in a roll over. The invention design provides more protection under these conditions.

No prior art seat belt on the market encircles the passenger's waistline or is automatically adjusting. The invention seat belt incorporates a self-adjusting retractable shoulder belt and a continuous lap belt into one easy-to-use arrangement.

The invention seat belt originates at the buckle point. The belt is permanently attached at this buckle point by, for example, sewing (preferred), rivets, etc. The seat belt goes across the seat up against the seat back and goes through the first slip ring. The first slip ring is attached to the (first) retractor, that is mounted to the floor at the rear corner of the seat. The belt continuous up to the second slip ring, that is mounted to the vehicle's interior wall, pillar, etc. Then the belt goes into the (second) retractor point.

When a person sits on the seat the belt is already positioned behind his/her waist line, so all he/she has to do is take the clasp and insert it into the buckle and pull gently on the shoulder belt to take out any slack that might be present.

A preferred embodiment of the invention seat belt involves a continuous belt originating from a retractor located in the outer wall of the vehicle through a slip ring that is mounted to the outer wall at a height at or above the shoulder of the occupant, and continuing down the outside edge of the seat through a metal slip ring that is attached to a belt that is part of another retractor that is fastened to the floor next to the rear of the seat. The belt continues across the front of the seat back and is attached to the belt-female buckle assembly that is bolted to the floor. The male part of the buckle is a sliding type that is on the continuous belt between the two slip rings. When a person sits in the seat the belt is already behind the person's waist and when the belt is drawn and fastened the belt comes across the person's chest and waist in a normal fashion. The two retractors provide automatic adjustment for different size people.

The improved seat belt arrangement for an occupant of a vehicle or other conveyance, includes a seat for the occupants in the vehicle. There is a continuous belt that is affixed on one end to the floor of the vehicle located on one side of the seat and that is attached one the other end to a first retractor affixed to a portion of the vehicle on the other side of the seat. There is also a first slip ring is attached by means of a belt segment to a second retractor that is affixed to the floor of the vehicle located on the other side of the seat. The continuous belt passes through the first slip ring. A second slip ring is attached to the vehicle, located on the other side of the seat at a height at or above shoulder of the occupant. The continuous belt passes through the first slip ring. A clasp is slidably mounted on the continuous belt between the first slip ring and the second slip ring. A buckle is affixed to the floor of the vehicle, located on the one side of seat at or in proximity of the location where the continuous belt is affixed to the floor of the vehicle. When the clasp is inserted into the buckle, the portion of the continuous belt between the first slip ring and the floor affixation of the continuous belt is located behind the back (waist) of the occupant, the portion of the continuous belt between the clasp and the first slip ring is located around or across the lap (front) of the occupant, and the portion of the continuous belt between the clasp and the second slip ring is located over the front of the occupant and the shoulder of occupant on the other side of the seat.

DETAILED DESCRIPTION OF THE INVENTION

Figure 1:
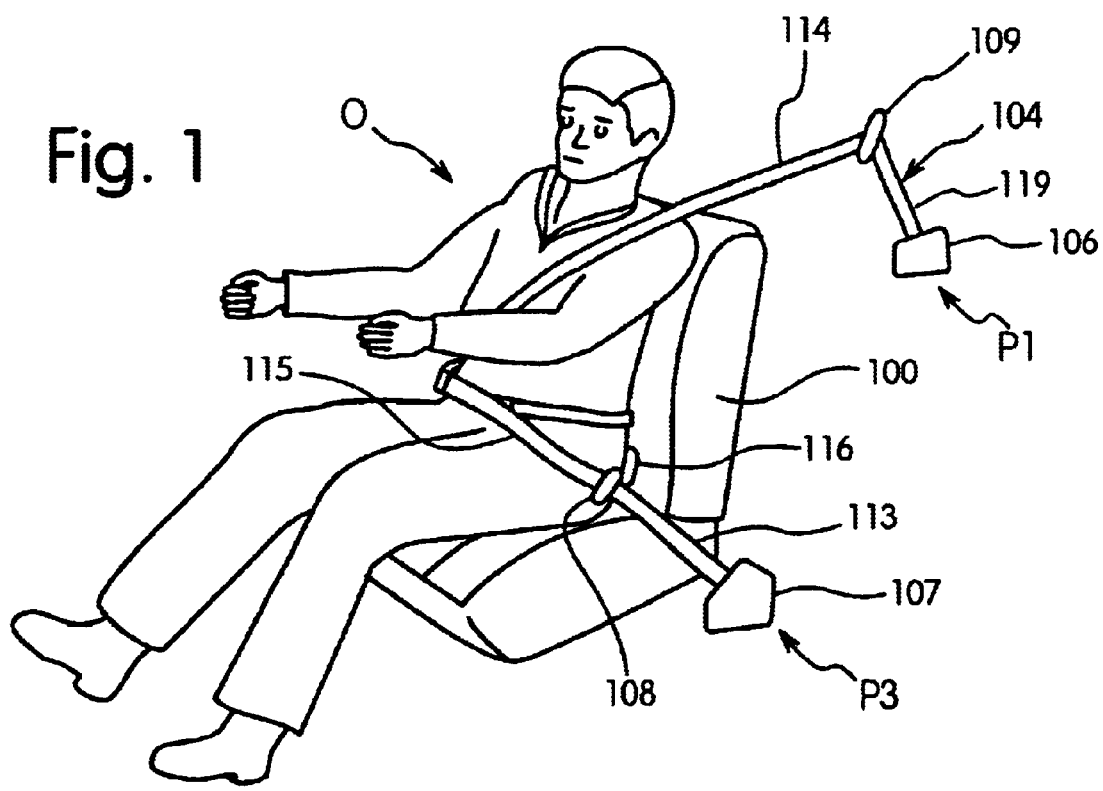
FIG. 1 is a perspective view of an occupant in a vehicle seat with the invention seat belt in the fastened position.

The preferred embodiment of the invention is shown in FIGS. 1 to 11. The seat belt device 123 of the invention is designed to replace the three-point shoulder harness assembly (not shown) conventionally provided in modern vehicles, such as automobiles, but utilizes some features thereof as detailed herein. Such conventional three-point shoulder harness assembly is designed to restrain the driver or occupants O from forward motion during a vehicle accident while the occupant is seated in the normal position upon a seat (103). Such seat (103) includes a lower portion on which the occupant sits and an elevated or essentially vertical back portion which may or may not be tiltable in a forward or rearward direction dependent upon the particular automobile's features.

The seat belt assembly includes the continuous, unitary seat belt 103 that has terminal end portions 104 and 105 and intermediate portions 120, 114, 115 and 116. The first terminal portion 104 of the continuous belt 103 is conventionally attached to the first vehicle mounting point P1 generally above the occupant's shoulder and at a generally reinforced portion of the vehicle body or frame such as a post 101 or the like (not shown). This first vehicle mounting point P1 is conventional retractor 106 takes the form of a frictional roller which enables the belt to be alternately played out and frictionally retracted for positioning and comfort of the occupant yet provides for fixed retention during an emergency situation. Such roller constructions are conventional and, accordingly, have not been shown. When converting a conventional three-point shoulder harness to the seat belt device 123 of the invention, the wall retractor in the factory installed harness can be used as the retractor 106.

As seen in FIG. 1, the continuous belt 104 runs (belt portion 119) from the first retractor 106 to and through the second slip ring 109, that is mounted above the first retractor 106 on the vehicle body or frame, here vehicle side post 101. The slip rings 108 and 109 have to be constructed of materials having sufficient strength to withstand the stress, strain and shock imparted thereon by the occupant's body as a result of collision, crash, roll over, etc., by the vehicle, so the slip rings of 108 and 109 preferably are constructed of a metal that fulfills such strength/shock requirements and most preferably are made of steel.

The continuous belt 104 continues down to and through the first slip ring 108. The second retractor 107 is mounted (P3) on the floor of the vehicle (or the base mounting of seat 100) on the same side of seat 100 as the first retractor 106. The belt segment 113 is conventionally attached to the second retractor 107. The first slip ring 108 is mounted on the outward terminal end of the belt segment 107 (by means of end loops 121 thereof that is preferable sewn together).

Figure 2:
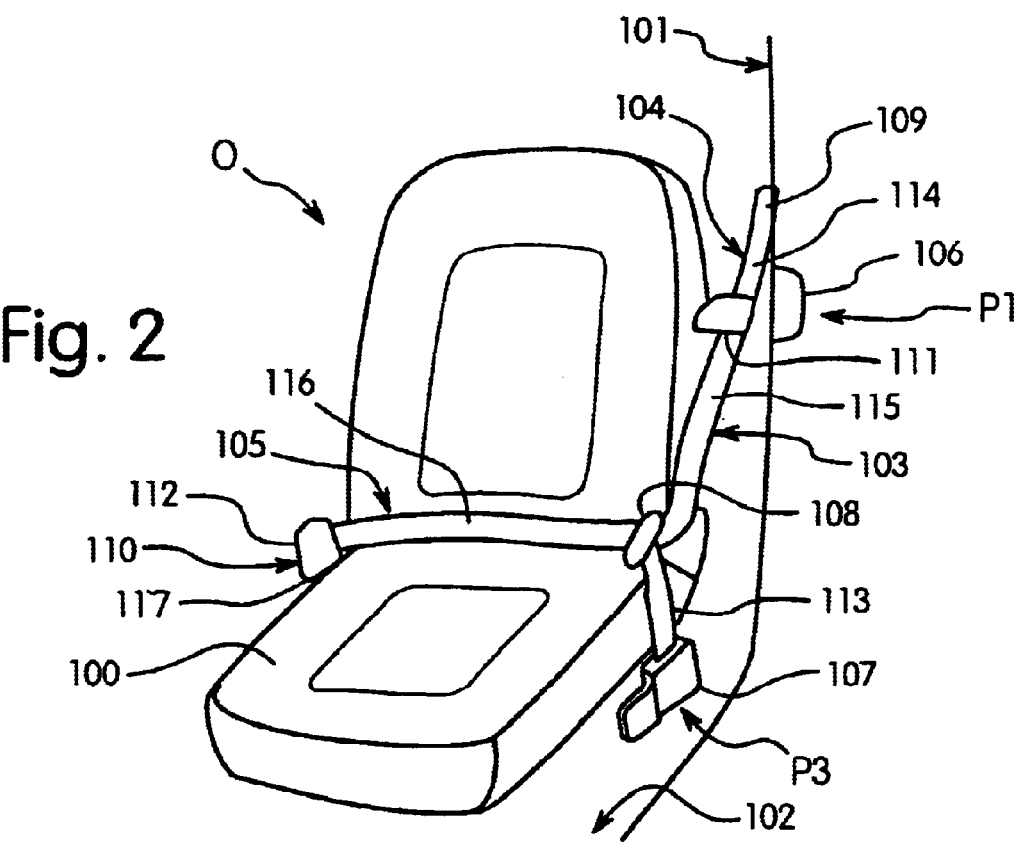
FIG. 2 is a perspective view of the invention belt is the unfastened position.
Figure 3:
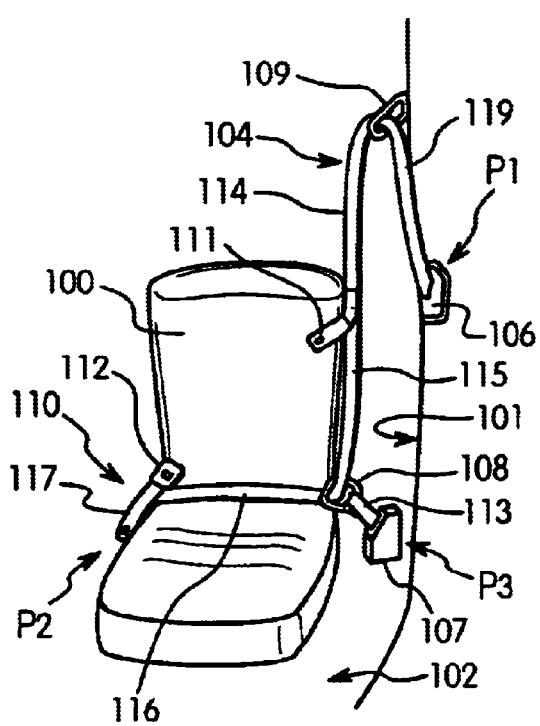
FIG. 3 is another perspective view of the invention belt in the unfastened position.

On the other side of the seat 100 is located the buckle device 110, that includes the arm 117, and buckle (female) portion 112. See, for example, FIG. 9. On one end of the arm or post 117 is mounted (P2) on the floor 102 of the vehicle. The buckle device 110 is fixedly attached to the other end of arm or post 117. The buckle device 110 can be the factory installed buckle devise of a conventional three-point shoulder harness. As illustrated in FIG. 2, the continuous belt 103 runs (belt portion 116) from the first slip ring 108 to the buckle device 110. The second terminal portion 105 of the continuous belt 103 is fixedly attached at 120 to the upper portion of arm 117 by suitable means such as a rivet(s), preferably by sewing. The belt portion 116 is located at the back waist area or small of the back of the occupant.

Clasp (mail portion) 111 of the buckle device 110 is slidably mounted on the continuous belt 103 between slip rings 108 and 109, forming portions 114 and 115 of the continuous belt 103. See FIGS. 2 and 8.

When the seat belt device 123 is in the unfastened position, as shown in FIG. 2, belt portions 114 and 115 of the continuous belt 103 are located along the side of the seat 100.

Figure 4:
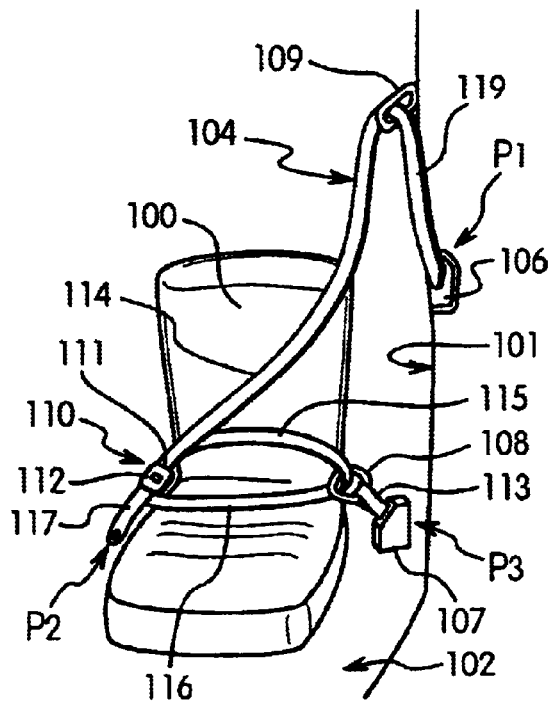
FIG. 4 is a perspective view of the invention belt in the fastened position.
Figure 5:
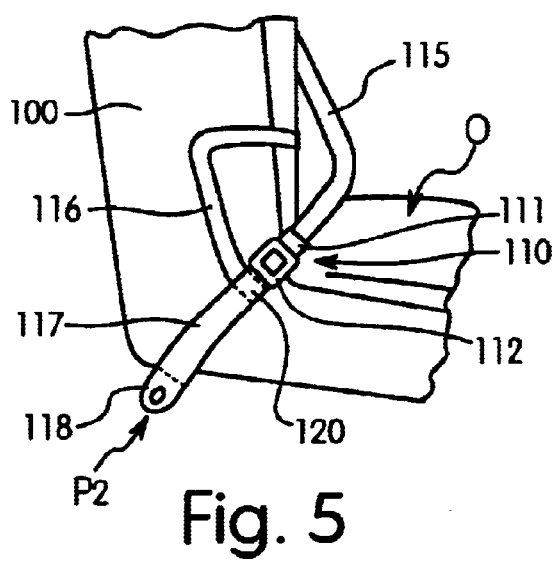
FIG. 5 is a left side, partial elevational view of the invention belt in the fastened position.
Figure 6:
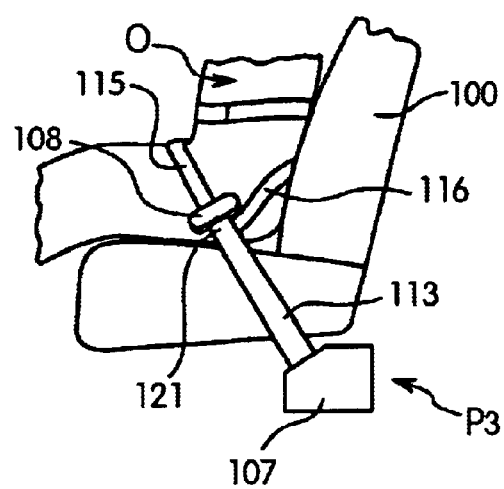
FIG. 6 is a right side, partial elevational view of the invention belt in the fastened position.
Figure 7:
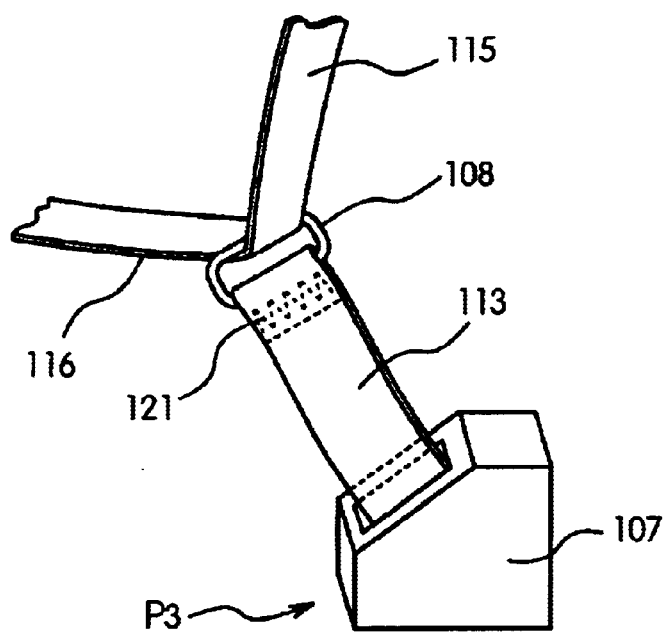
FIG. 7 is a perspective view of the second retractor and the first slip ring.
Figure 8:
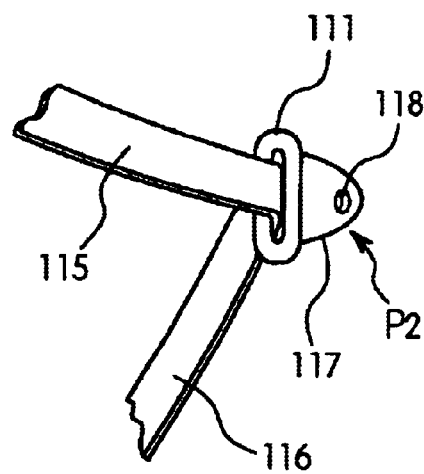
FIG. 8 is a top elevational view of the first slip ring and the second retractor.
Figure 9:
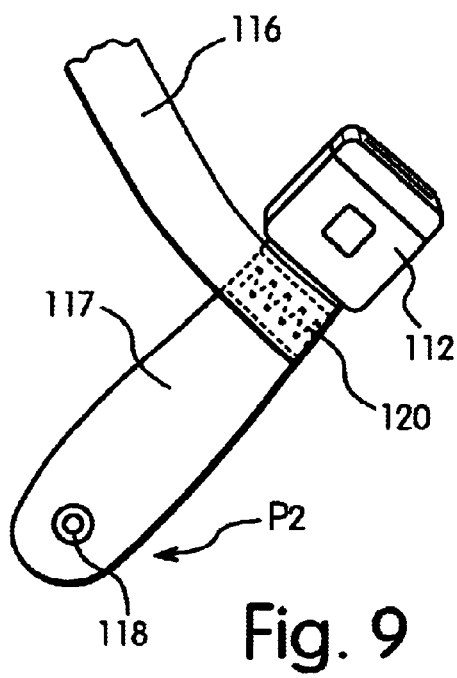
FIG. 9 is a left side, elevational view of the floor mounted buckle portion.
Figure 10:
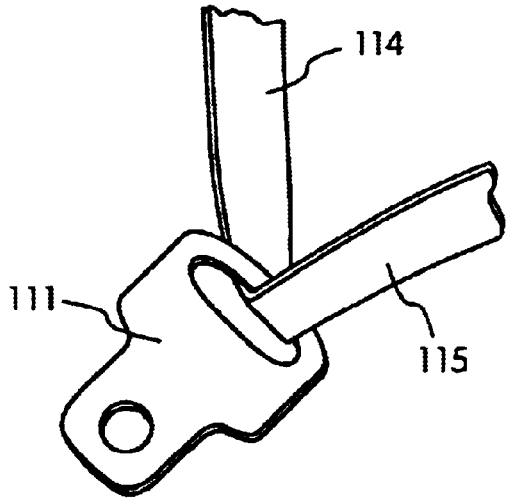
FIG. 10 is left side, elevational view of the clasp of the buckle device.
Figure 11:
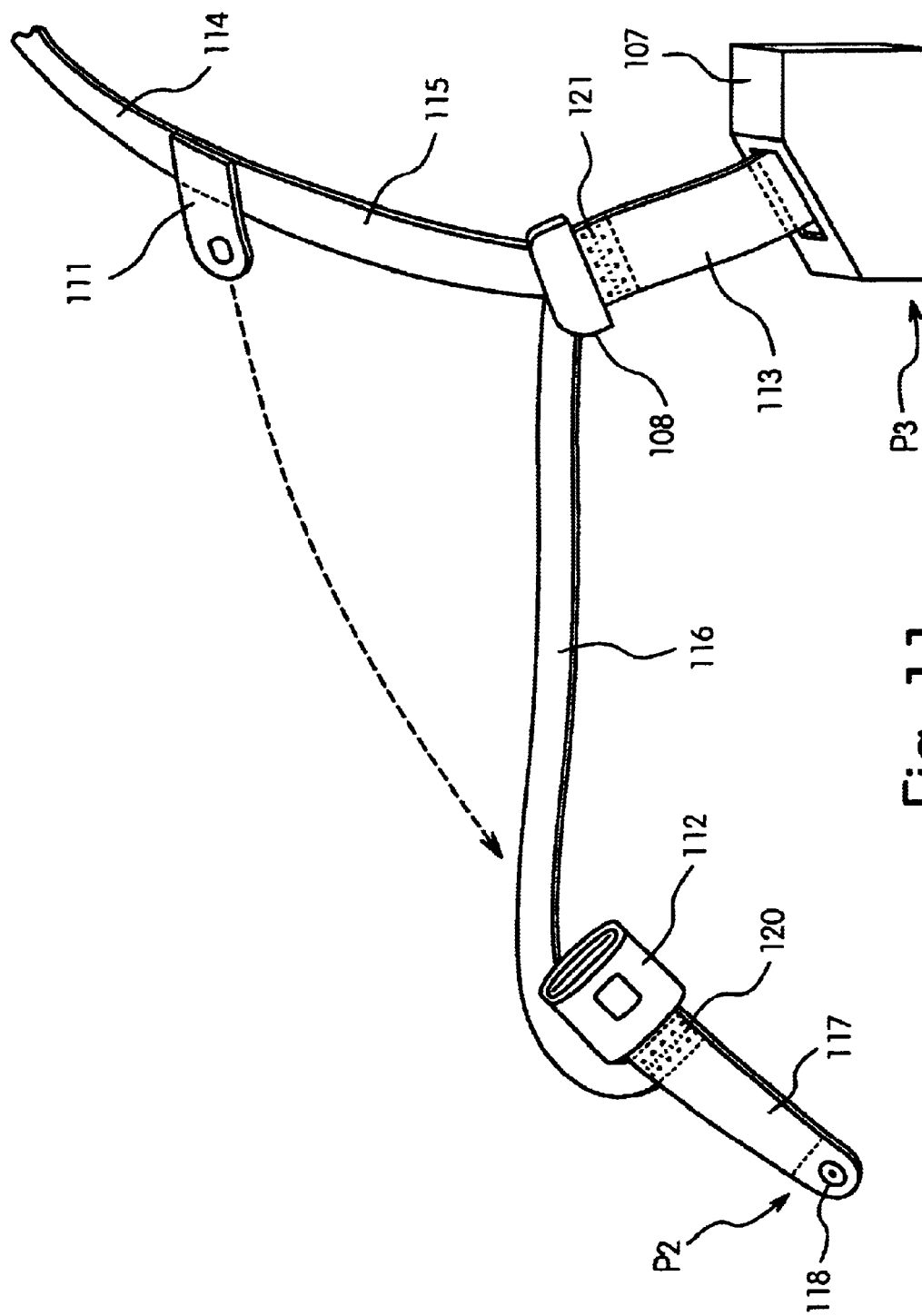
FIG. 11 is a perspective view illustrating insertion of the clasp in the buckle portion.

As shown in FIGS. 1 and 4 to 5, when the clasp 111 is coupled with buckle portion 112, the belt portion 114 of the belt 103 is drawn across the shoulder and chest of the seated occupant and the belt portion 115 of the continuous belt portion 115 of the continuous belt 103 is drawn across the front waist area of the seated occupant. The belt portion 116 of the continuous belt 103 with the belt portion 115 forms a loop around the waist of the occupant. In this manner, it will be apparent that when the occupant O is subjected to rearward forces the seat belt device 123 restrains such motion without the need for additional mounting point and in a straightforward, low-cost manner. The seat belt device 123 in restraining such rearward motion of the occupant additionally reduces the strain placed upon the back of seat 100 such that it is less likely the seat back will fail and, accordingly, secondarily injure occupants in the automobile's back seat or second or third seats, is so provided.

When the seat belt device 123 is in the engaged position, retractors 106 and 107 automatically adjust the continuous belt 103 (portions thereof) to the size of the occupant. In this manner, the sear belt device 123 incorporates a self-adjusting retractable continuous shoulder belt and a self-adjusting retractable continuous lap belt into one easy-to-use arrangement. With today's conventional three point belts it is common for people to slide out (of such prior belts) to the front in a front collision or slide out the top (of such prior belts) in a roll over. The invention design provides more protection under these conditions.

U.S. Pat. No. 6,213,508 discloses a device for restraint of a user directly sitting in a vehicle seat for use in combination with a vehicle seat restraint of the type known as a three-point shoulder belt and having a first unitary belt, including opposed first and second terminal ends which are in turn respectively fixedly attached to a first vehicle mounting point above the user's shoulder and a second vehicle mounting point below the user's lap when the user is normally seated upon the vehicle seat. Both of the first and second mounting points are located on one side of the seat. The first belt includes a fastener segment mounted thereon and through which the first belt is adapted to run freely. The fastener segment attached to the vehicle at a third vehicle mounting point located proximate to the seat and on the opposite end thereof from which the first and second vehicle mounting points are located such that the belt is restrained at three points when the fastener segment is releasably attached to the third vehicle mounting point in the normal use position of the three-point shoulder belt. The device includes a second belt having first and second terminal ends and first and second intermediate runs. The first terminal end of the second belt is fixedly attached to the first belt at a position proximal to the seat and on the same side thereof as the first and second vehicle mounting points. The second belt passes across the seat and in the back of the user. The second terminal end of the second belt is fixedly attached to the third vehicle mounting point below the first fastener segment. The first and second intermediate runs of the second belt. Are adjustedly affixed together. The second belt is in a use position so as to restrain the user from rearward motion as during a vehicle accident. Such patented seat belt device is an improvement over the conventional three-point seat belt harnesses. However, it is more complex than the seat belt device of the invention. Moreover, the self-adjusting seat belt device of the invention provides better protection from exiting forward from, the seat belt in the case of the rear end collision or upwards in the case of the rollover.

Figure 12:
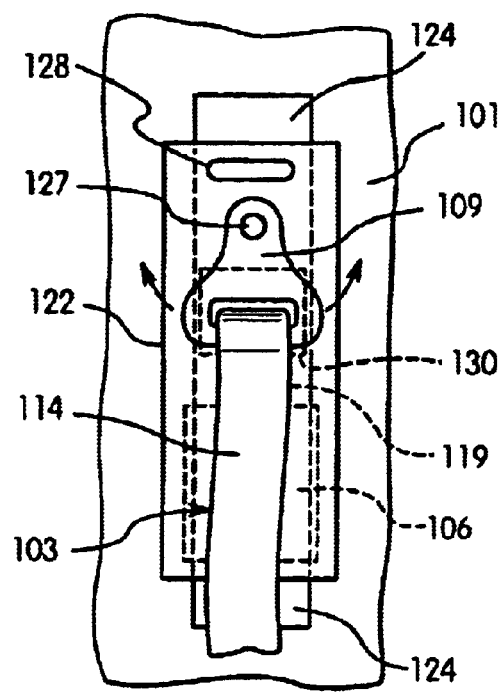
FIG. 12 is a partial top elevational view of one embodiment of the adjustable top slip ring arrangement.
Figure 13:
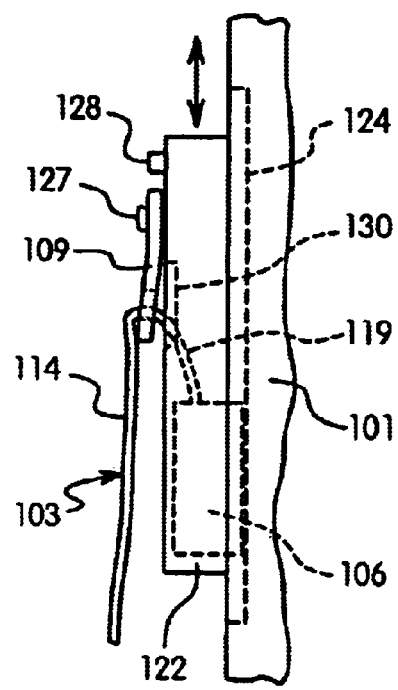
FIG. 13 is a partial side elevational view of the arrangement of FIG. 12.

FIGS. 12 and 13 illustrate an arrangement that allows the raising or lowering of the second slip ring 109 to adjust the height of the belt portion 114 (at shoulder height or above). The first retractor 106 is mounted in the casing 122. The second slip ring 109 is pivotally mounted (127) on the casing 122 above the location of the first retractor 106. The belt portion 119 runs from the first retractor 106 to the second slip ring 109 through opening 130 in the top of the casing 122. The casing 122 can be moved up and down in the slot 124. The casing 122 is mounted in a releasable fixed manner in the slot 124. The casing 122 can be released by pushing down (in) on depress release 129 that allows movement of the casing 122 in the slot 124.

Figure 14:
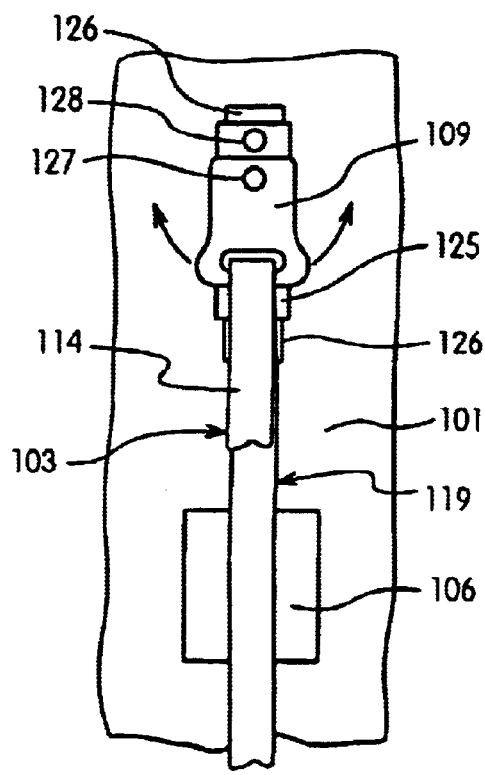
FIG. 14 is a partial top elevational view of another embodiment of adjustable top slip ring arrangement.
Figure 15:
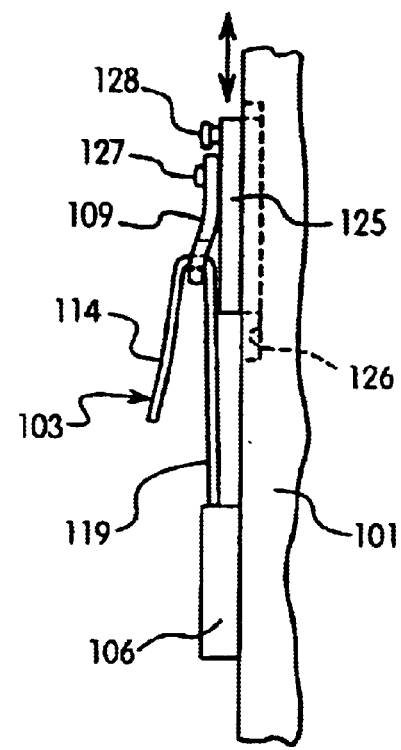
FIG. 15 is a partial side elevational view of the arrangement of FIG. 14.

FIGS. 14 and 15 illustrates another arrangement that allows the raising or lowering of the second slip ring 109 to adjust the height of the belt portion 114 (at shoulder height or above). The second slip ring 109 is pivotally mounted (127) on the mounting 125 that can be moved up or down in slot 126. the mounting 125 is mounted in a releasable, fixed manner in the slot 128. The mounting 126 can be released by pulling up (out) the lift release 128 that allows movement of the mounting 125 in the slot 126.

While there is shown and described herein a certain specific structure embodying this invention, it will be manifest to those skilled in the art that various modifications and rearrangements of the parts may be made without departing from the spirit and scope of the underlying inventive concept. It will also be manifest that the inventive concept is not limited to the particular forms shown and described herein, except insofar as indicated by the scope of the appended claims.

The following is a listing of the numerals in the drawings:

100 Vehicle seat
101 Vehicle side post
102 Vehicle floor
103 Continuous, unitary seat belt
104 First terminal end portion of belt 103
105 Second terminal end portion of belt 103
106 First retractor
107 Second retractor
108 First slip ring
109 Second slip ring
110 Buckle device
111 Clasp (male portion) of buckle device 110
112 Buckle (female) portion of buckle device 110
113 Belt segment emanating from retractor 107
114 Portion of belt 103 between slip ring 109 and clasp 110
115 Portion of belt 103 between clasp 110 and slip ring 108
116 Portion of belt 103 between slip ring 108 and buckle portion 112
117 Arm for mounting buckle portion 112 to vehicle floor 102
118 Floor mounting
119 Portion of belt 103 between slip ring 109 and retractor 106
120 Connection between belt portion 116 and floor mounting arm 117
121 Connection between ring 108 and belt segment 113
122 Casing for retractor 106 and slip ring 109
123 Seat belt device or harness assembly
124 Slot for reciprocal movement of casing 122
125 Mounting for slip ring 109
126 Slot for reciprocal movement of mounting 125
127 Pivotable mounting for slip ring 109
128 Lift release for moving mounting 125
129 Depress release for moving casing 122
130 Opening in top of casing 122 for passage of belt portion 119

What is claimed is:

1. A seat belt comprising: a continuous belt originating from a retractor located in an outer wall of the vehicle through a slip ring that is mounted to the outer wall at a height at or above a shoulder position of an occupant, and continuing down the outside edge of a seat through a metal slip ring that is attached to a belt that is part of another retractor that is fastened to the floor next to the rear of the seat; the belt continues across the front of the seat back and is attached to a belt-female buckle assembly that is bolted to the floor; a male part of the buckle is on the continuous belt between the two slip rings; when the occupant sits in the seat the belt is already behind the occupant's waist position and when the belt is drawn and fastened the belt comes across the occupant's chest and waist positions in a normal fashion; the retractors provide automatic adjustment for different size people.

2. An improved seat belt arrangement for an occupant of a vehicle or other conveyance, comprising:

a seat for the occupant in the vehicle;

a continuous belt that is affixed on one end to the floor of the vehicle located on one side of the seat and that is attached on the other end to a first retractor affixed to a portion of the vehicle on other side of the seat;

a first slip ring that is attached by means of a belt segment to a second retractor that is affixed to the floor of the vehicle located on the other side of the seat, the continuous belt passes through the first slip ring;

a second slip ring that is attached to the vehicle, located on the other side of the seat, at a height at or above shoulder of the occupant, the continuous belt passes through the second slip ring;

a clasp that is affixed to the continuous belt between the first slip ring and the second slip ring;

a clasp that is slidably mounted on the continuous belt between the first slip ring and the second slip ring; and a buckle that is affixed to the floor of the vehicle, located on the one side of seat, at or in proximity of location where the continuous belt is affixed to the floor of the vehicle, when the clasp is inserted into the buckle, the portion of continuous belt between the first slip ring and the floor affixation portion of the continuous belt is located behind the back position of the occupant, the portion of the continuous belt between the clasp and the first slip ring is located around or across the lap position of the occupant, and the portion of the continuous belt between the clasp and the second slip ring is located over the front and shoulder positions of occupant.

3. Seat belt device for the vehicle, comprising:

first retractor means located above a seat in the vehicle;

second retractor means located below top of horizontal part of the seat on the same side as the first retractor means;

first slip ring means attached to end of the belt segment emanating from second retractor means;

second ring means located above the first retractor means;

buckle means mounted on floor of the vehicle on other side of the vehicle;

continuous seat belt means having first and second terminal ends, the first terminal end being affixed to first retractor means, the second terminal end being affixed to mounting of the buckle means, the continuous seat belt means passing through the first and second slip ring means; and clasp means slidably mounted on the continuous seat belt means between the first retractor means and the first slip ring means, the clasp means being capable of mating with the buckle means, the continuous seat belt means passing through the second slip ring means between the first retractor means and the clasp mean.

* * * * *